United States Patent

[11] 3,553,508

| [72] | Inventor | Georges Stcherbatcheff<br>Paris, France |
|---|---|---|
| [21] | Appl. No. | 806,579 |
| [22] | Filed | Mar. 12, 1969 |
| [45] | Patented | Jan. 5, 1971 |
| [73] | Assignee | Societe Civile De Recherches En<br>Matiere De Micro-Moteurs Electriques<br>(S.O.C.R.E.M.), Paris, France |
| [32] | Priority | Mar. 22, 1968 |
| [33] | | France |
| [31] | | No. 144,881 |

[54] ELECTRIC MOTOR WITH A PLURALITY OF RADIALLY ARRANGED BRIDGE-TYPE MAGNETIC CIRCUITS
8 Claims, 6 Drawing Figs.

[52] U.S. Cl. .................................................. 310/152,
310/181, 310/269
[51] Int. Cl. ............................................. H02k 21/00
[50] Field of Search............................................ 310/40,
40MM, 43, 49, 152, 154, 155, 159, 162, 163, 164,
168, 179, 181, 269; 335/303

[56] References Cited
UNITED STATES PATENTS

| 2,159,768 | 5/1939 | MacMillan.................. | 310/152 |
| 2,483,539 | 10/1949 | Hansen......................... | 310/163 |
| 3,024,392 | 3/1962 | Baermann..................... | 335/303 |
| 3,408,573 | 10/1968 | Wullkopf...................... | 335/303 |
| 3,411,059 | 11/1968 | Kaiwa............................ | 310/49 |
| 3,417,270 | 12/1968 | Koegel ......................... | 310/49 |

*Primary Examiner*—Milton O. Hirshfield
*Assistant Examiner*—R. Skudy
*Attorney*—Cushman, Darby and Cushman ABSTRACT: A plurality of pairs of radially disposed magnetically permeable plates with included permanent magnets disposed therebetween with the plates including cutout portions providing an annular volume for housing at least one electrical coil and which cutout portions also divide each pair of plates into at least first and second sets of tooth-shaped stator or field poles for bridge-type magnetic circuits in an electric motor. A concentrically disposed rotor is also provided with at least first and second sets of tooth-shaped rotor poles angularly phased to cooperate and magnetically couple with the sets of stator poles thus completing bridge-type magnetic circuits within the motor.

PATENTED JAN 5 1971　3,553,508
SHEET 1 OF 2
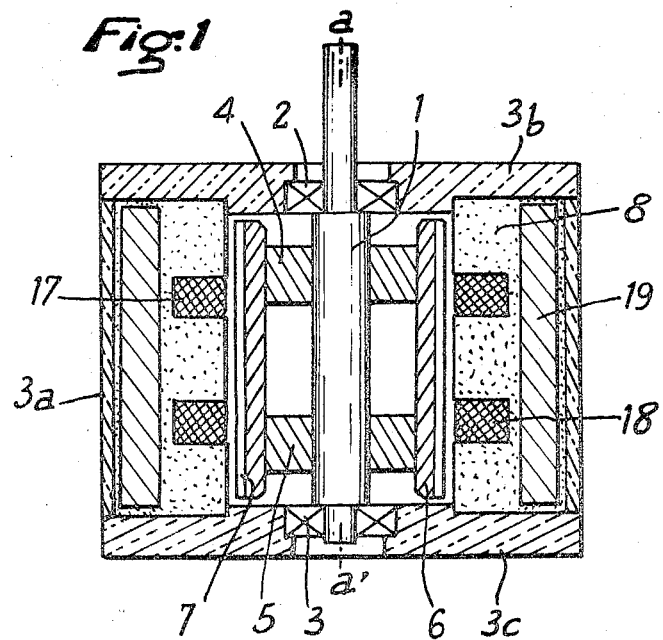
Fig.1
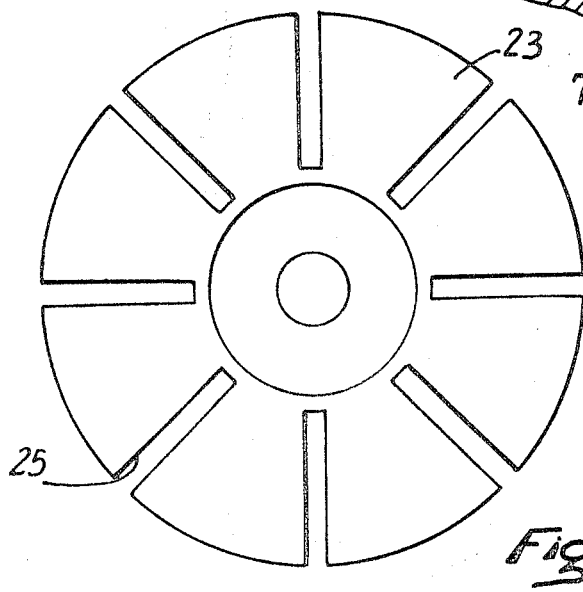
Fig.2
Fig.6

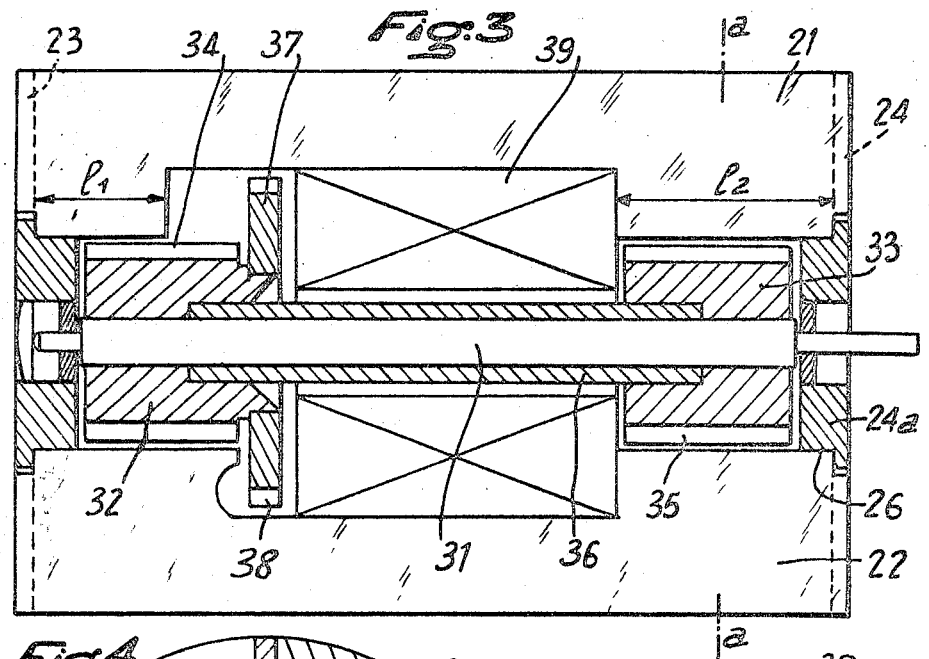
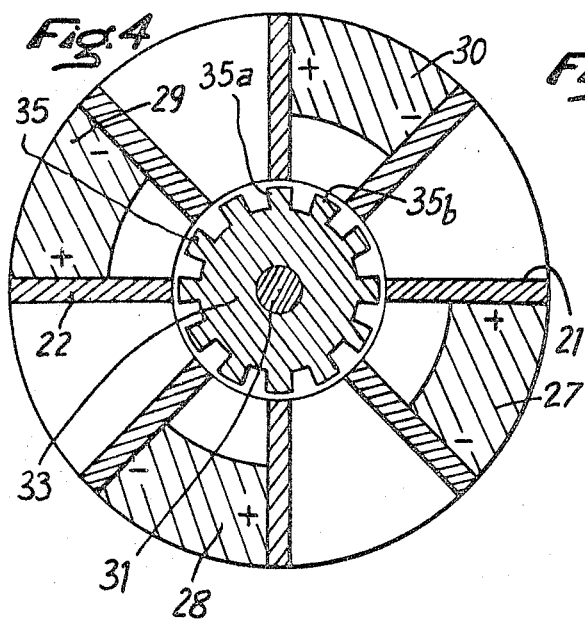
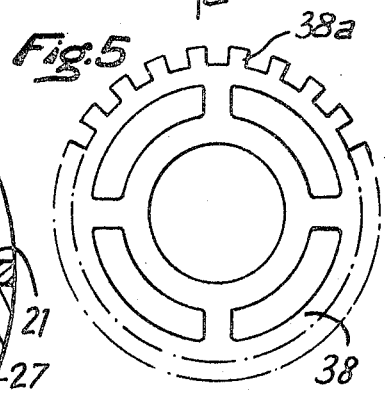

ELECTRIC MOTOR WITH A PLURALITY OF RADIALLY ARRANGED BRIDGE-TYPE MAGNETIC CIRCUITS

The present invention relates to electric synchronous motors having a permanently magnetized stator.

It is an object of the present invention to provide a synchronous motor of simple and dependable design which is adapted for miniature construction, while having a comparatively high torque and being capable of self-starting operation.

A synchronous motor generally includes a multipolar field, an associated field coil for generating an alternating flux and a permanent magnet for providing an excitation flux. Various types of structures are known, which have all in common a number of disadvantages. In these prior art structures, the alternating flux generally passes through the magnet, which has a poor magnetic permeability, or through a number of parasitic airgaps, and this highly increases the magnetic losses of the motor.

Moreover, when only a small number of ampere turns is available, which is the case for instance when the motor is used in a timing device, the excitation flux which may be effectively used in such structures, and consequently, the resulting torque, are comparatively small.

It is an object of the present invention to provide a synchronous motor in which the alternating flux path does not include any parasitic airgap or low permeability portions, and in which a comparatively large excitation flux may be used, even when a small number of ampere turns is available in the field coil.

Another object is to provide a synchronous motor in which a comparatively large excitation flux may be used, the field coil yet having a small internal cross section and, therefore the resistive losses therein being small.

A further object is to provide a miniature synchronous motor adapted for being supplied with power in a very simple and economical fashion by means of a source of direct current associated with means for chopping up the said current into pulses of constant sign.

Still another object is to provide a miniature step-by-step motor which is self starting and adapted for being reliably controlled in a comparatively large number of positions of the rotor.

A feature of the invention is the provision of a synchronous motor including a plurality of radially arranged "bridge-type" magnetic circuits.

In my copending application Ser. No. 495,642 filed on Oct. 13, 1965 now issued U.S. Pat. No. 3,469,133 for "Electric motors with a bridge-type magnetic circuit" there has been disclosed a synchronous motor including one bridge-type magnetic circuit; said circuit comprising a stationary field comprising a coil and at least one permanent magnet having at least two pole pieces surrounding the coil; a moving armature in the form of a core having the shape of an elongated member disposed along the axis of the coil and terminated by two pole shoes whereof each forms two gaps with the end faces of the respective permanent magnet pole pieces. The said pole shoes act as flux tappings, placing each end of the armature in communication with an opposite pole of the magnet by magnetic coupling through the said gaps. The two gaps at each end of the armature constitute four variable reluctances respectively forming the four arms of a bridge, the magnet thus being connected in one of the diagonals of the said bridge, and the armature in the other diagonal thereof.

In such a bridge-type magnetic structure, the transformation of electrical energy into mechanical energy originates from the variations in reluctance of the four arms of the bridge. These reluctance variations result from the rotation of the armature about its axis, the pole pieces of the field and the pole shoes of the armature being so cut out as to form two pairs, or sets of salient poles, each pair forming two equal variable reluctances in phase opposition to one another.

I have subsequently discovered a novel design for a bridge-type magnetic motor structure, which is generally equivalent with the magnetic structure disclosed in the above-mentioned copending application, yet being yet simpler and more economical in design.

In accordance with this invention, the salient pole pieces of the field comprise a plurality of pairs of plates made of a soft magnetic material, said plates being radially arranged and a plurality of permanent magnets being wedged up between the plates of said respective pairs.

In the structure according to the invention, each of said pairs forms, together with a corresponding part of the armature, a bridge-type magnetic circuit, whereby the structure finally consists of a plurality of radially arranged bridge-type magnetic circuits.

These and other objects and features of the invention will more clearly appear with the aid of the following description.

In the accompanying drawings:

FIG. 1 is a schematic axial sectional view of a slow synchronous motor according to an embodiment of the invention;

FIG. 2 is a transverse sectional view of the motor shown in FIG. 1;

FIG. 3 is an axial sectional view of a micromotor according to the invention, which is more particularly adapted for driving a clockwork;

FIG. 4 is a section along $a-a$ of FIG. 3;

FIG. 5 is a plan view of the double frequency zone which the armature of the motor of FIG. 3 comprises; and FIG. 6 is a plan view of one of the end plates which the casing of such a motor comprises.

FIG. 1 shows, in section through a plane containing its axis of rotation $aa'$, a slow synchronous motor whose armature or rotor comprises a nonmagnetic shaft 1 supported by two bearings 2 and 3 mounted on two supports 3b—3c and a tubular member 6, made of soft iron, provided with a set of teeth or salient rotor poles 7 of pitch P. This member is centered on the shaft by two members 4 and 5.

The field or stator is constituted of a plurality of radially disposed stacks of plates such as 8 to 16 cut out in an E-shape as shown in FIG. 1, the angular positions of the successive stacks of plates corresponding alternately, in the example in question to P for stacks 8-9 and to 3P/2 for stacks 9-10. The coils 17-18 are housed in the annular spaces defined by the notches of the stacks of plates cut out in the E-shape. A permanent magnet system 19, generally of annular form, is constituted of separate magnets such as 19a to 19d, disposed between those of the stacks of plates which form an angle of 3P/2 between them, as shown in FIG. 2.

These magnets have poles disposed as indicated in FIG. 2, the positive poles being in phase with one another, i.e. for the position of the rotor shown, all the stacks of plates which constitute the corresponding salient stator poles or pole pieces have their ends located opposite teeth of the rotor, and the negative poles being in phase with one another, but in phase opposition with the positive poles, i.e. for the position of the rotor shown the stacks of plates which constitute the corresponding pole pieces have their ends located opposite the gaps between teeth of the rotor. This phase setting of the poles could obviously be obtained with other angular positionings of the stacks of plates. The stator forms a compact unit securely connected to the cylindrical part 3a of the casing and obtained by molding. The spaces between stacks of plates not occupied by the magnets are filled with plastics material (at 20 for example). The centering of the rotor with respect to the stator is ensured by the shoulders of the supports 3b-3c on which the pole pieces rest. This mode of construction avoids a rectification or further shaping of the elements of the stator, the cutting out of the stacks of plates having, of course, to be effected with a sufficient accuracy.

The same tool for cutting out the plates thus enables motors of various sizes to be produced very economically. According to the mode of construction that has just been described, two-phase or more generally polyphase motors may be produced.

FIGS. 1 and 2 illustrate the case of a two-phase motor. the three arms of the E which constitute the stacks of plates of the stator form three assemblies of active surfaces opposite three corresponding portions of the sets of teeth on the rotor.

It may be shown that, for the two-phase motor shown in FIGS. 1 and 2 to operate, i.e. in order to create a two-phase counterelectromotive force identical to that which would be produced by a rotary field, it is necessary and is sufficient that these active surfaces are respectively proportional to 1, **2 and 1 and that the two end portions of the set of teeth of the rotor are respectively shifted by + 135° and − 135° with respect to the central portion. The motor which has just been described is a motor with variable reluctance comprising a plurality of bridge-type magnetic circuits. A magnetic circuit of this type is mainly characterized by the fact that a portion of rotor passing through the axis of a coil comprises, at each of its two ends, a set of teeth forming two gaps respectively with cutout pole pieces of opposite polarities of a magnet of the stator, these two sets of teeth thus acting as flux tappings placing each end of said rotor portion in communication with an opposite pole of this magnet by means of said gaps. These latter thus constitute four variable reluctances respectively forming the four arms of a bridge, the magnet and the rotor portion being connected in the two respective diagonals of the said bridge.

If in fact one of the coils and two of the pole pieces, which are positive and negative respectively and constituted of the stacks of plates, are considered, it is seen that the ends of the corresponding rotor portion are each connected to these two pole pieces. This motor thus comprises a plurality of radially arranged bridge-type circuits.

As these circuits are identical and very short, it is possible to provide a large number thereof and thus to obtain a synchronous motor with a large number of steps, thus a slow motor. The inertia of the rotor is very low. In order to produce the set of teeth of the rotor in three portions shifted as indicated hereinabove, three sintered elements provided with identical straight sets of teeth may be assembled, in shifted relationship, in order to constitute the member 6.

An approximate solution, which is easier to effect and satisfactory in practice, consists in forming a member 6 made in one piece and in milling sets of teeth inclined at a suitable angle with respect to the axis of the rotor.

Another embodiment particularly adapted to large sizes consists in constituting the teeth of the rotor from stacks of sheet metal plates, according to a technique identical to that used in the stator and previously described above to that used in the stator.

The motor shown in FIGS. 3 and 4 is a micromotor particularly designed for the step-by-step operation, of a clockwork under the control of pulses of constant sign, supplied for example by a transistor chopper circuit of known type fed by a single battery.

Its stator too comprises cutout plates such as 21-22 made of magnetic sheet metal, shown in a plan view at FIG. 3, and in side view at FIG. 4. These radially disposed plates are fitted in supports 23-24. FIG. 6 shows the notches such as 25 which receive the ends of the plates and thus define their angular position. Each plate is supported on a bearing such as 26 defined by the central hub 24a of the corresponding support.

The stator further comprises, fixed between these plates as shown in FIG. 4, permanent magnets 27 to 30 advantageously made of moulded magnetic plastics material. These magnets are disposed parallel to the longitudinal axis of the motor, over the whole of its length and magnetized so that their faces in contact with the plates have the polarities indicated in FIG. 4.

The rotor is constituted of a shaft 31, for example made of steel, on which are fitted two members 32 and 33 provided on their periphery with sets of teeth 34 and 35 respectively. FIG. 4 shows at 35a and 35b two of the teeth of the set of teeth 35, which has 12 in the present example, where it is a question of a motor with 12 steps per revolution. A crosspiece 36 ensures the magnetic connection between the shaft 31 and the members 32 and 33. According to a particular feature of this embodiment of the motor of the invention, an annular member 37 is securely connected to the member 32 and itself has a peripheral set of teeth 38.

As may be seen in FIG. 5, the set of teeth 38 comprises 24 teeth, such as 38a, the pitch being 15° instead of 30° for the members 32 and 33.

A coil 39 is threaded on the crosspiece 36 at the moment of assembly.

It will be readily realized that this motor comprises a plurality of radially arranged "bridge" circuits of the general type as defined above.

As may be seen in FIG. 4, each of the eight pole pieces of the stator is shifted by 1.5 steps with respect to an adjacent pole piece of opposite polarity and, taking into consideration the distribution of the teeth of the rotor, one of the two pole pieces is located opposite a gap between two teeth of the rotor when the other is located opposite a tooth: in other words, there is obtained the phase opposition which is mentioned in the above-cited copending application.

It was explained in the said patent application that one may act on the relative phase of the second harmonics of the torque law of the motor in the rest position, for the purpose of obtaining an optimum law, by providing certain of the pole pieces of the stator with a set of teeth corresponding to a frequency double that comprised by the other pole pieces. In the embodiment described at present, a similar result is obtained by giving the rotor two sets of teeth of frequency N and one set of teeth of frequency 2 N, this latter being carried by the member 37; in the example in question, N=12. Moreover, when it is desired to control a motor having a bridge-type magnetic structure by means of pulses of constant sign, it may be shown that a certain dissymmetry must exist between the end faces of the pole pieces located on either side of the coil, so as to give a predominance, concerning the flux, to the positive poles located on one side of the coil and to the negative poles located on the other side. This dissymmetry appears in FIG. 3, in which it is seen that the length $l_1$ of the left-hand arm of the pole piece 21 is shorter than the length $l_2$ of the right-hand arm.

The motor of FIG. 3, mounted in accordance with a system of assembling radial sheets similar to that of FIG. 1, presents the same advantages.

It has been possible to show that the structure of the stator, as it appears in FIG. 4, must preferably comprise a repetition symmetry of the order of four or a multiple of four, the combined effect of the inevitable and sometimes relatively considerable inaccuracies of centering the pole pieces, on the one hand, and of angular distribution of the pole pieces around the rotor, on the other hand, then being particularly well compensated for, this constituting a noteworthy practical importance in the obtaining of a correct operation of the motor with acceptable manufacturing tolerances.

It is to be understood that various modifications could be devised by the skilled man, without departing from the spirit and scope of the invention, as defined in the appended claims.

I claim:

1. An improved electric motor having bridge-type magnetic circuits, said motor comprising:
   an elongated armature formed of a magnetically permeable material and disposed for rotation about an axis;
   said elongated armature including at least first and second sets of axially spaced-apart salient rotor poles;
   a stationary field structure disposed about said armature including;
   a plurality of pairs of magnetically permeable plates radially disposed about said axis;
   a permanent magnet disposed between each of said pairs of plates for causing one of each of said pair of plates to have a magnetic polarity opposite that of the other;
   at least one cutout portion in each of said plates for defining salient stator poles with the remaining uncut portions;
   first and third sets of said stator poles axially spaced to one side of said cutout portion in substantial phase opposition and disposed for magnetically coupling with said first set of spaced rotor poles;

second and fourth sets of stator poles axially spaced to the other side of said cutout portions in substantial phase opposition and disposed for magnetically coupling with said second set of spaced rotor poles, said first and second sets of stator poles being substantially in phase opposition; and an energizing electrical coil disposed concentrically about said armature and substantially within an annular volume defined by said cutout portions.

2. An improved electric motor as in claim 1, wherein said motor includes:
   a casing with two end supports having shoulders therein; and
   said plates having terminal edges resting on said shoulders.

3. An improved motor as in claim 1, wherein the said armature includes at least one further set of rotor poles, the number of poles of said further set being twice the number of poles in each of said first and second sets of rotor poles.

4. An improved electric motor as in claim 1, wherein said motor is a polyphase motor having:
   at least two spaced-apart energizing coils coaxially disposed with respect to said armature;
   said pairs of plates further forming fifth and sixth sets of salient stator poles axially spaced from other stator poles and in substantial phase opposition; and
   said armature further including a third set of rotor poles axially spaced from said first and second sets of rotor poles and disposed for magnetically coupling with said fifth and sixth sets of stator poles.

5. An improved electric motor as in claim 1, wherein the number of said plurality of pairs of magnetically permeable plates is evenly divisible by four.

6. An improved electric motor as in claim 5, wherein said pairs of plates are symmetrically disposed about the said axis to provide a repetition symmetry of the order of four or a multiple of four.

7. An improved stator structure for an electric motor having bridge-type magnetic circuits, said stator structure comprising:
   a plurality of pairs of magnetically permeable plates radially disposed about an axis;
   a permanent magnet disposed between each of said pairs of plates for causing one of each of said pair of plates to have a polarity opposite that of the other; and
   at least one cutout portion in each of said plates for defining an annular electrical coil housing volume and for defining salient stator poles with the remaining uncut portions.

8. An improved stator structure as in claim 7, including:
   a casing with two end supports having shoulders therein; and
   wherein said plates have terminal edges resting on said shoulders.